US012649657B2

(12) United States Patent
Li

(10) Patent No.: US 12,649,657 B2
(45) Date of Patent: Jun. 9, 2026

(54) PRODUCTION OF BORON NITRIDE NANOSHEETS

(71) Applicant: Deakin University, Geelong (AU)

(72) Inventor: Luhua Li, Geelong (AU)

(73) Assignee: DEAKIN UNIVERSITY, Geelong (AU)

( * ) Notice: Subject to any disclaimer, the term of this patent is extended or adjusted under 35 U.S.C. 154(b) by 539 days.

(21) Appl. No.: 18/245,830

(22) PCT Filed: Sep. 2, 2021

(86) PCT No.: PCT/AU2021/051016
§ 371 (c)(1),
(2) Date: Mar. 17, 2023

(87) PCT Pub. No.: WO2022/056580
PCT Pub. Date: Mar. 24, 2022

(65) Prior Publication Data
US 2024/0025742 A1 Jan. 25, 2024

(30) Foreign Application Priority Data

Sep. 21, 2020 (AU) ................................. 2020903381

(51) Int. Cl.
*C01B 21/00* (2006.01)
*C01B 21/064* (2006.01)
*B82Y 30/00* (2011.01)
*B82Y 40/00* (2011.01)

(52) U.S. Cl.
CPC ........... *C01B 21/0648* (2013.01); *B82Y 30/00* (2013.01); *B82Y 40/00* (2013.01); *C01P 2004/24* (2013.01)

(58) Field of Classification Search
None
See application file for complete search history.

(56) References Cited

U.S. PATENT DOCUMENTS

2016/0325994 A1* 11/2016 Qu ........................... C09D 1/00
2019/0330067 A1* 10/2019 Pacheco Benito ...... B02C 19/18

FOREIGN PATENT DOCUMENTS

| CN | 105263858 | A | 1/2016 |
| CN | 205628157 | U | 10/2016 |
| CN | 107716002 | A | 2/2018 |
| CN | 107735437 | A | 2/2018 |
| CN | 108163847 | A | 6/2018 |
| CN | 109956499 | A | 7/2019 |
| CN | 110203896 | A | 9/2019 |
| CN | 110746563 | A | 2/2020 |
| CN | 111137866 | A | 5/2020 |

(Continued)

OTHER PUBLICATIONS

JP-2000202316-A, English translation (Year: 2000).*

(Continued)

*Primary Examiner* — Stefanie J Cohen
(74) *Attorney, Agent, or Firm* — Michael Best & Friedrich LLP

(57) ABSTRACT

A method of producing boron nitride nanosheets comprising: milling a hexagonal boron nitride crystal material in a ball mill to exfoliate substantially two-dimensional nanosheets from the boron nitride crystal material, wherein ball milling is undertaken within a viscous liquid ball milling medium having a viscosity of 100 to 100,000 mPa·s.

13 Claims, 9 Drawing Sheets

(56)            References Cited

FOREIGN PATENT DOCUMENTS

| | | | |
|---|---|---|---|
| EP | 1278701 B1 | 7/2008 | |
| JP | 2000202316 A * | 7/2000 | |
| JP | 2018137363 A | 8/2018 | |
| WO | WO-2018107795 A1 * | 6/2018 | ............. B82Y 40/00 |

OTHER PUBLICATIONS

WO-2018107795-A1. English translation (Year: 2018).*

PCT/AU2021/051016 International Search Report and Written Opinion dated Nov. 2, 2021.

Singh, D et al., "High-Efficient Production of Boron Nitride Nanosheets via an Optimized Ball Milling Process for Lubrication in Oil," Sci. Rep., Dec. 2014, vol. 4, No. 7288.

Wang, Z et al., "Scalable Exfoliation and High-Efficiency Separation Membrane of Boron Nitride Nanosheets." Chemistry Select, Mar. 2020, vol. 5, pp. 3567-3573.

Li et al., "Large-scale mechanical peeling of boron nitride nanosheets by low-energy ball milling," Journal of Materials Chemistry 2011, 21, 11862.

Chinese Patent Office First Office Action and Search Report for Application No. 202180075769.8 dated Mar. 12, 2024 (15 pages including English translation).

Guo Ruisong et al., Engineering Structural Ceramics, Tianjing University Press, p. 23, dated May 31, 2002 (46 pages with Statement of Relevance).

Wu et al., Journal of Synthetic Crystals, vol. 47, No. 11, "Studies on processes for preparing h-BN nanosheets by a ball milling-reinforced liquid phase exfoliating method", p. 2248-2254, dated Nov. 15, 2018 (9 pages with English abstract).

Zhao et al., Journal of Functional Materials, No. 12, "Research development of methods for preparing boron nitride nanosheets", p. 12071-12075, Dec. 30, 2016 (6 pages with Statement of Relevance).

European Patent Office Extended Search Report for Application No. 21867937.1 dated Jul. 23, 2025 (11 pages).

Li Lu Hua et al: "Large-scale mechanical peeling of boron nitride nanosheets by low-energy ball milling", Journal of Materials Chemistry, vol. 21, No. 32, Jul. 7, 2011 (Jul. 7, 2011), p. 11862, XP093289629, GB ISSN: 0959-9428, DOI: 10.1039/c1jm11192b.

Japanese Patent Office Action for Application No. 2023-517820 dated Jul. 22, 2025 (11 pages including English machine translation).

* cited by examiner

PRODUCTION OF BORON NITRIDE NANOSHEETS

TECHNICAL FIELD

The present invention generally relates to the production of boron nitride nanosheets, also known as white graphene, from hexagonal boron nitride crystals using ball milling techniques and it will be convenient to hereinafter disclose the invention in relation to that exemplary application.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

There is currently a world-wide interest in two-dimensional (2D) nanosheets including graphene, nanosheets of hexagonal boron nitride (hBN) and molybdenum disulphide ($MoS_2$) because of their attractive mechanical, thermal and electronic properties. hBN nanosheets have many unique characteristics such as a wide bandgap, deep ultraviolet light emission, high thermal conductivity and stability, controllable electrical conductivity and unique wettability. hBN is also considered as a green lubricant which can be used in engine oil at high temperatures.

Similar to other 2D materials, hBN nanosheets (BNNSs) can be produced in either a bottom-up or top-down manner. The bottom-up method includes chemical vapor deposition and segregation method; the top-down method is exfoliating bulk hBN crystals via mechanical or sonication methods.

A number of studies, for example Deepika. et al. High-Efficient Production of Boron Nitride Nanosheets via an Optimized Ball Milling Process for Lubrication in Oil. Sci. Rep. 4, 7288; DOI:10.1038/srep07288 (2014), have demonstrated that tailored wet ball milling is an efficient and high-yield method to produce atomically thin BN nanosheets of fair crystallinity.

Although tailored wet ball milling is the most promising method to produce large quantities of BNNS at relatively low costs, there are two main problems that have not been solved. The first problem is the size of the BNNS produced from prior balling methods is small, mostly between 0.5 and 1.0 μm even when a liquid milling medium was involved. The second problem is that the quality of the BNNS from ball milling was relatively low, including an unacceptable number of defects.

These two problems are associated with the nature of the ball milling technique, which is traditionally designed to introduce high energy impacts to break-down to nanoparticles. The size and quality of BNNS is important to improve the performance of many applications of this material, such as stronger nanocomposites, better corrosion protection, and superior thermal conductivity.

Examples of ball milling arrangements used to produce a two-dimensional material such as graphene or hexagonal boron nitride are taught in Chinese Patent Publications CN 110203896 A and CN 109956499 A. Each of these patent publications teach that the use of polymeric milling balls and/or milling equipment along with secondary (i.e. a separate process step) ultrasonication of the milled material can increase production of the two-dimensional material. However, these documents do not investigate optimisation of other ball milling parameters on the production characteristics of that two-dimensional material.

Based on the above, there is still some scope to improve ball milling production techniques for forming boron nitride nanosheets. It would therefore be desirable to provide an alternative or improved ball milling process and/or apparatus for producing boron nitride nanosheets.

SUMMARY OF THE INVENTION

A first aspect of the present invention provides a method of preparing boron nitride nanosheets, comprising:

milling a hexagonal boron nitride crystal material in a ball mill to exfoliate substantially two-dimensional nanosheets from the boron nitride crystal material, wherein ball milling is undertaken within a viscous liquid ball milling medium having a viscosity of 100 to 100,000 mPa·s.

The present invention provides an improved system for producing boron nitride nanosheets (BNNS—also characterised as two-dimensional boron nitride crystal material and is also known as white graphene) by using ball milling medium and/or equipment designed to reduce the impact of and thus energy transferred from the ball milling equipment to the feed hexagonal boron nitride crystal material compared to traditional methods. The ball mill performs a milling process, typically a low impact milling process, which mills or exfoliates/peels substantially two-dimensional nanosheets from the crystal grain surface of the boron nitride crystal material. Lower impact exfoliation reduces the defects present in the exfoliated material and can result in larger sized sheets being produced from the process compared to prior art ball milling processes.

The present invention therefore overcomes the problems of previous attempts to produce BNNS by ball milling, i.e. increasing the size of the BNNS product and minimizing the defects created during the ball milling process. To reduce the ball-to-ball and ball-to-jar impacts a milling medium with high viscosity are used. As a result, BNNSs with diameters one order of magnitude larger than that produced by previous conditions and lower density of defects can be produced. Whilst other factors affecting BNNS production have been found (for example milling ball and milling equipment material properties as discussed above), the correlation between the viscosity of the milling and exfoliation medium on the yield, size, and quality of the final BNNS product has not been previously discovered.

The commercial application of BNNSs depends on the large-scale production of the material in high quality at high efficiency and low cost. The present invention provides such a production route of BNNSs for various applications.

Lower impact ball milling is provided in the arrangement of the present invention through the viscosity of the milling medium used in the ball mill. Traditional wet ball milling equipment used to produce BNNS typically used liquid medium with low viscosity, which provided freedom of movement of the milling balls within the milling vessel during the milling process. Whist not wishing to be limited to any one theory, the inventor has found that the viscosity of the milling medium, rather than its chemical composition, is important to the impact control during the exfoliation process. The inventor has found that highly viscous wet medium can be used to reduce the impact of the milling balls during milling, by assisting to slow movement and thus reduce energy transfer during impact between the milling balls and milled material (boron nitride crystals) during milling.

The viscous liquid ball milling medium has a viscosity of 100 to 100,000 mPa·s. In some embodiments, the viscous liquid ball milling medium has a viscosity of 200 to 50000 mPa·s, preferably 500 to 20000 mPa·s, more preferably 1000 to 20000 mPa·s, and yet more preferably 1000 to 10000 mPa·s.

It is to be understood that the viscosity of the liquid medium for the present invention is measured with a rheometer using an oscillation testing type (a shear rheometer). One exemplary example of a suitable rheometer is HR-3, TA Instruments, USA.

The appropriate viscosity of the milling medium can be produced using a variety of different compositions, including the compositions listed below. However, it should be appreciated that the present invention is not limited to those specific compositions and would extend to other compositions and milling medium not specifically listed.

There are three general groups of these new milling medium that can be used of the viscous liquid ball milling medium of the present invention selected from at least one of:

i. a high viscosity liquid;
   ii. a high viscosity solution using a high molecular weight organic solute dissolved in a solvent; or
   iii. a material melted to form a molten milling medium.

Firstly, materials in liquid form and of a high viscosity, such as a syrup, for example a sugar-based syrup, or polyethylene glycol. In some forms, the sugar syrup can be a sucrose-based syrup solution. Each of these materials have relatively low molecular weights. It is noted that sugar/sucrose is in a viscous liquid form in this embodiment.

The term sugar in the present description refers to simple carbohydrates, such as saccharides, more particular monosaccharides and disaccharides. The milling medium of the present invention can comprise any suitable sugar-based solution or syrup which provides the required liquid viscosity. Examples of suitable sugars include monosaccharides, such as glucose, fructose, and galactose; disaccharides such as sucrose, lactose or maltose or combinations thereof. In some embodiments, the sugar syrup can be based on regular sugar which essentially consists of sucrose.

In particular embodiments, the sugar content of a sugar syrup based milling medium composition comprises an aqueous sugar solution comprising from 50 to 90% w/w solution, preferably from 50 to 80% w/w sugar solution, more preferably 60 to 75% w/w solution. This sugar solution can in some embodiments be formed by dissolving the sugar (for example domestic grade raw sugar) in hot water or other suitable solvent. However, various other sugar solution/syrup preparation methods could also be used.

Secondly, wherein the high viscosity solution comprises polyvinyl alcohol or polyacrylamide dissolved in water, ethanol or another suitable solvent. In this aspect, materials (mostly organic materials) that have high dissolvability in water, ethanol or other solvents which form highly viscous solution. Examples include polyvinyl alcohol or polyacrylamide each of which have very large molecular weights.

It should be appreciated that the involvement of organic medium can also add functional groups on the surface of BNNS, with the advantages of less likely agglomeration and easier to bond to polymer composites.

Thirdly, the molten milling medium comprises a molten polymer. In this aspect, molten materials such as molten polymers can be used when heated to a temperature above their melting temperature. One example is polyurethane in a molten phase at >60° C. Polyurethane can turn from solid at room temperature to a molten phase at >60° C., providing a milling medium having a high viscosity.

The milling medium is preferably removable, more preferably easily removable through washing by water, ethanol and other solvent. For example, where a sugar syrup is used, that milling medium can be easily removed using water.

It is preferred that the milling medium is compatible with the milling ball and milling vessel materials. For example, where the milling ball and milling vessel materials comprises polymeric materials, for example nylon, polyethylene, acetal, or polystyrene, the milling medium is preferably selected to be compatible with that material.

The temperature of the milling medium can be controlled to modify the viscosity of the milling medium. The method of the first aspect can therefore further comprise controlling the temperature of the milling medium during ball milling to provide a desired viscosity during ball milling. For example, a lower temperature can be used to increase the viscosity of polymer solutions, such as polyvinyl alcohol ethanol solution. Another example is to use an elevated temperature to melt polymer to form highly viscous milling medium. In comparison, all previous tailored wet ball milling processes used to produce BNNS were conducted at room-temperature without using any temperature control.

In some embodiments, lower impact ball milling to the arrangement of the present invention can be also be improved through selection of the materials used for the ball milling vessel and milling balls. Traditional ball milling equipment used to produce boron nitride nanosheets typically used metal or ceramic ball milling jars and balls, which can greatly reduce the dimension of the BNNS product and produce a large number of defects in them. In the present invention, one or both of the milling balls and milling vessels can be preferably constructed from a polymeric material. Examples of suitable polymeric materials include a plastic such as nylon, polyethylene, acetal, or polystyrene; or rubber. These polymeric materials are much less dense than ceramics or metals and therefore produce a lower impact on the bulk boron nitride crystal during milling. This can maximize the size and quality of the BNNS product. In addition, the use of lighter milling jars and balls can be more cost effective than metal or ceramic equivalents as this can result in a comparative energy saving during operation.

Milling parameters including milling speed, milling time, ball-to-powder ratio, and milling ball size can be varied for a particular ball milling arrangement to optimise exfoliation efficiency and production yield. It should be appreciated that these parameters highly depend on the type and size of the milling apparatus and milling vessel, the material, density, size, and number of the milling balls of the milling balls, and the viscosity of the milling medium.

Examples of parameters in particular embodiments include having a rotating speed of ball mill of 50 to 300 revs/min, preferably 50 to 200 rev/min. In some embodiments, the ball milling temperature is room temperature to 150° C., preferably 20° C. to 80° C. In some embodiments, the ball-milling is conducted for a milling period of 1 to 200 h, preferably 1 to 100 h.

Furthermore, in many embodiments milling balls of 0.1 to 5.0 mm in diameter may be effective in exfoliating BN particles to BNNSs.

Ball milling can be conducted under a number of conductions. In some embodiments, ball milling is conducted under an air atmosphere or inert atmosphere mixture. In embodiments, the inert atmosphere may be nitrogen atmosphere, argon atmosphere or helium-atmosphere.

The feed material for milling/exfoliation in the ball mill is a hexagonal boron nitride crystal (hBN) material. The feed hBN material is typically shaped as flat disc-like or plate like particles having tens, hundreds, or tens of hundreds of nanometer thickness. The feed material can have a variety of characteristics depending on the source of the hBN. In some embodiments, the starting hBN particles have a typical disc-like shape with diameters (average diameter/size in the flat plane) of 0.5 to 100 µm, preferably from 5 to 80 µm, and more preferably from 10 to 50 µm. In embodiments, the thickness of the feed hBN is in the order of 50 to 500 nm, preferably 50 to 200 nm, and in some embodiments about 100 nm.

Ball milling according to the present invention can be combined with ultrasonication in some embodiments to enhance exfoliation of the two-dimensional boron nitride nanosheets from the bulk crystal. Ball milling and ultrasonication use different mechanisms to exfoliate BNNS, and the combination of the two techniques can greatly improve the efficiency and yield of the process. In such embodiments, the method can further comprise the step of:

applying an ultrasonic vibration to the viscous ball milling medium during milling.

The addition of ultrasonication/ultrasound to the milling process can assist exfoliation of hexagonal boron nitride (hBN). Compared with traditional ball milling alone, the addition of ultrasonication method, has greater productivity and assists in producing BNNSs with larger lateral sizes.

The ultrasonic vibration can be applied to the viscous ball milling medium prior to, during or after ball milling operation. In preferred embodiments, the ultrasonic vibration is applied to the viscous ball milling medium during ball milling operation. In some embodiments, the ultrasonic vibration has a frequency of 18 to 200 kHz, preferably 18 to 180 kHz, more preferably 18 to 150 kHz. In embodiments, the ultrasonic vibration has a frequency of 20 to 180 kHz, preferably 50 to 150 kHz. In one embodiment, the ultrasonic components had a frequency of 40 kHz and power of 300 W.

The present invention is applicable to a variety of ball mill configurations. In some embodiments, the ball mill comprises at least one of: a traditional ball mill; a planetary ball mill; or an agitated ball mill.

A second aspect of the present invention provides an apparatus which produces boron nitride nanosheets, that comprises:

a ball mill comprising a plurality of milling balls and a vessel configured to receive and enclose a hexagonal boron nitride crystal material, the plurality of milling balls and a liquid ball milling medium, the ball mill being configured to drive movement of milling balls within the vessel and thereby exfoliating substantially two-dimensional nanosheets from the hexagonal boron nitride crystal material when immersed in the liquid ball milling medium;

wherein the liquid ball milling medium comprises a viscous liquid comprising a viscosity of 100 to 100000 mPa·s.

As outlined above, operation of the ball mill drives movement of milling balls within the vessel, causing the milling balls to exert a combination of impact, friction and shearing forces on the boron nitride crystal material and thereby exfoliating the boron nitride crystal material to substantially two-dimensional nanosheets. This milling process mills, shears or exfoliates substantially two-dimensional nanosheets from crystal surface of the boron nitride crystal material. The ball mill efficiently exfoliates hexagonal boron nitride (hBN) particles to atomically thin BNNSs while creating minimum in-plane defects.

The viscous liquid ball milling medium has a viscosity of 100 to 100000 mPa·s. In some embodiments, the viscous liquid ball milling medium has a viscosity of 200 to 50000 mPa·s, preferably 500 to 20000 mPa·s, more preferably 1000 to 20000 mPa·s, and yet more preferably 1000 to 10000 mPa·s.

Again, the viscous liquid ball milling medium preferably comprises at least one of:

a high viscosity liquid;

a high viscosity solution using a high molecular weight organic solute dissolved in a solvent; or a material melted to form a molten milling medium.

It should be appreciated that the above three aspects are similar to those taught in relation to the first aspect. That disclosure equally applies to this second aspect of the present invention.

In order to further control or select viscosity of the milling medium, the apparatus may further comprise a temperature controller configured to control the temperature of the milling medium during ball milling to provide a desired viscosity during ball milling.

In some embodiments, the ball mill includes at least one of ball milling balls, or ball milling vessel comprising a polymer material. The polymeric material of the ball milling balls, or ball milling vessel can comprise any suitable polymeric material. In embodiments, said polymeric material may comprise at least one of: plastic or rubber, preferably nylon, polyethylene, acetal, and polystyrene.

Any suitable ball milling arrangement can be used with the present invention. In many embodiments, the ball mill comprises at least one of: a traditional ball mill; a planetary ball mill; or an agitated ball mill.

Like the first aspect, the apparatus can further comprise a high frequency ultrasound transducer operatively connected to the liquid milling medium and capable of applying ultrasonic frequencies of at least 18 to 200 kHz to the liquid milling medium during operation of the ball mill. In some embodiments, the ultrasonic vibration has a frequency of 18 to 200 kHz, preferably 18 to 180 kHz, more preferably 18 to 150 kHz.

The ultrasound frequencies/vibrations can be added to the set-up using any suitable arrangement. In a first embodiment, a jacket which includes an ultrasonic transducer is added onto the outside of the ball milling vessel. In other embodiments, an ultrasonic transducer/generator is added inside of or within one or more walls of the ball milling vessel.

A third aspect of the present invention provides boron nitride nanosheets (BNNS) produced according to the method of the first aspect of the present invention. In embodiments, these BNNSs have an average particle size of 5 to 10 µm. The BNNSs from the previous ball milling processes mostly had diameters of 0.5 to 1.0 µm. The BNNSs formed using the method and apparatus of the present invention can therefore be produced an order of magnitude larger than those that can be produced using conventional ball milling materials and milling medium. Furthermore, the BNNSs produced using the method and apparatus of the present invention can show less damage to their structure compared to BNNSs produced using prior art ball milling processes and arrangements. The product preferably comprises atomically thin BNNSs typically having minimum in-plane defects.

BRIEF DESCRIPTION OF THE DRAWINGS

The present invention will now be described with reference to the figures of the accompanying drawings, which illustrate particular preferred embodiments of the present invention, wherein.

DETAILED DESCRIPTION

Figure 1:
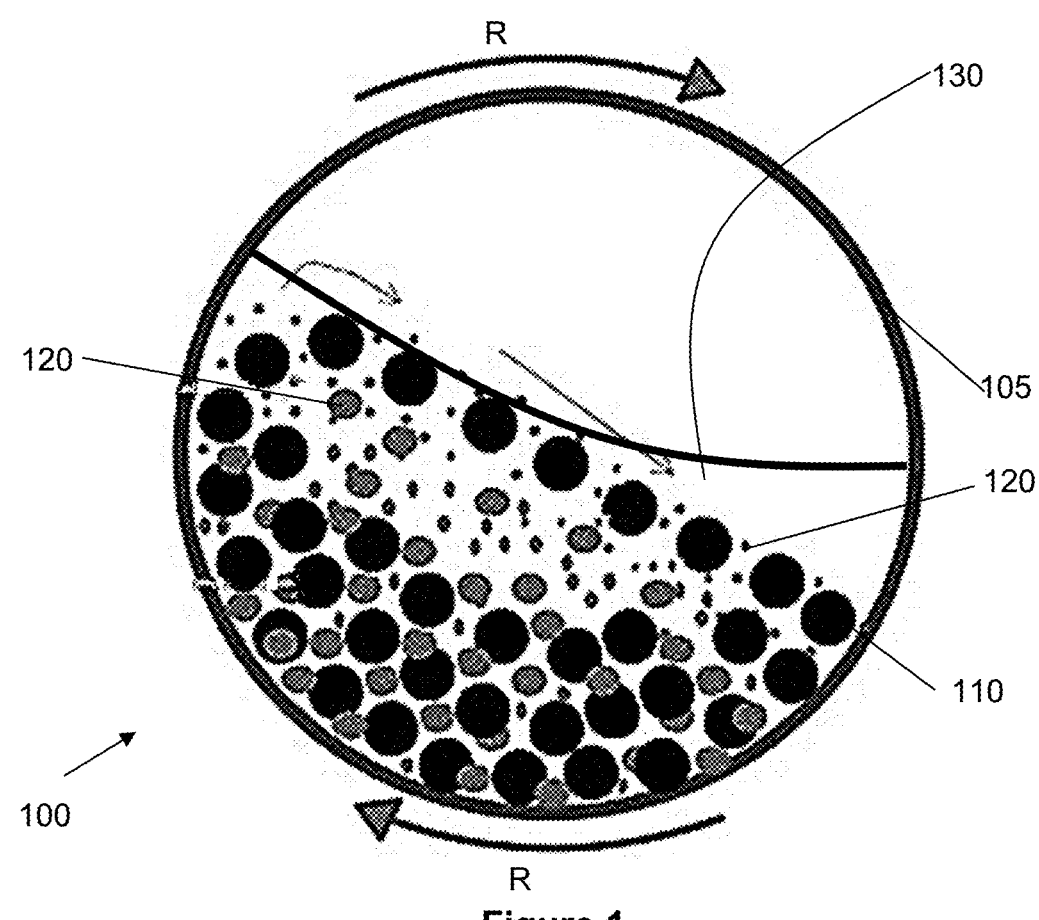
FIG. 1 is a schematic diagram of a conventional ball milling apparatus configured according to one embodiment of the present invention.

Boron nitride nanosheets (BNNSs) (also known as white graphene) have many fascinating properties. This invention concerns a production method of BNNSs using ball milling equipment under special conditions, which efficiently exfoliates hexagonal boron nitride (hBN) particles to large-sized atomically thin BNNSs while creating minimum in-plane defects. The production method of the present invention can potentially be scaled to facilitate large scale production of BNNSs.

Traditional ball milling of hexagonal BN, for example horizontal or vertical ball milling, has the advantage of being a simple process and possesses the potential for large-scale production of BNNSs. Whereas the milling balls not only exert a shearing force that produces an exfoliation effect, they also generate considerable impact force due to ball collisions. The impact force reduces the lateral size of the BNNSs and also affects their lattice structure adversely. Thus, the BNNSs prepared by this method usually have small lateral sizes and a large number of lattice defects.

Traditional ball milling equipment used to produce BNNSs typically uses metal or ceramic ball milling jars and balls, which greatly reduce the dimension of the BNNS product and produce a large number of defects in them. Traditional wet ball milling equipment used to produce boron nitride nanosheets typically used liquid medium with low viscosity, deteriorating the size and quality of the BNNS product.

The inventor has unexpectedly discovered that careful selection of ball milling medium can reduce the impact of and thus energy transferred from the ball milling equipment to the boron nitride crystal material compared to traditional ball milling methods. Lower impact exfoliation reduces the defects present in the exfoliated material and can result in larger sized sheets being produced from the process. The exfoliation of hBN particles to BNNS is the process to overcome the van der Waals interlayer interaction, which is of very low energy (about 10 meV/unit cell). In contrast, the normal ball milling impact is of high energy, up to 5 orders of magnitude higher than that required to exfoliate hBN or overcome its interlayer interaction. The much larger ball milling impact energy breaks the in-plane structure of BNNS, giving rise to smaller lateral sizes and relatively high density of defects.

It should be appreciated that a ball mill is a type of grinder used to grind, blend and sometimes for mixing of materials. It works on the principle of impact and attrition: size reduction is done by impact as the balls drop from near the top of the shell. A ball mill consists of a milling vessel—typically a hollow cylindrical shell rotating about its axis. In non-agitated ball mills, the axis of the shell may be either horizontal or at a small angle to the horizontal. It is partially filled with milling balls. The grinding medium are the balls, which may be immersed in a milling medium which covers the milling balls and feed material within the ball mill. The inner surface of the cylindrical shell may be lined with an abrasion-resistant material such as manganese steel or rubber lining. A ball mill operates through movement of the milling balls within the milling vessel.

Figure 2:
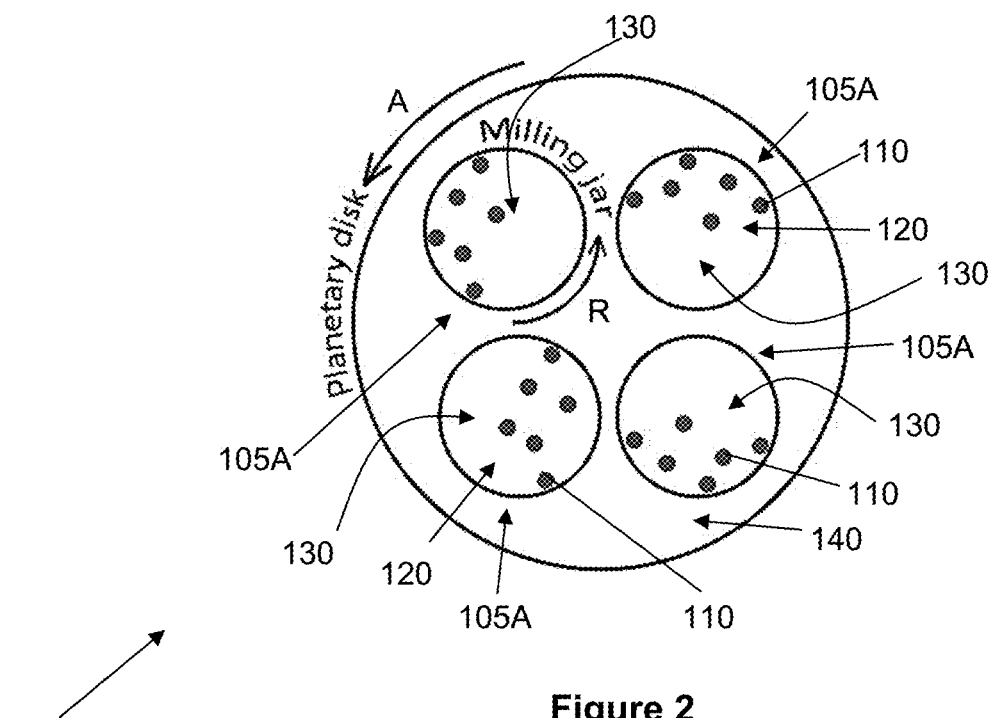
FIG. 2 is a schematic diagram of a planetary ball milling apparatus configured according to one embodiment of the present invention.

The present invention is applicable to a variety of ball mill configurations. In some embodiments, the ball mill comprises at least one of: a traditional ball mill; a planetary ball mill; or an agitated ball mill. Examples of two ball milling arrangements that can be used to produce BNNSs according to the method and apparatus of the present invention are illustrated in FIGS. 1 and 2. It should be appreciated that other ball milling arrangements are also applicable to the present invention, and that the present invention should not be limited to the ball milling arrangements illustrated in the Figures.

A traditional ball mill 100 is illustrated in FIG. 1. This ball mill 100 comprises a milling vessel in the form of a cylindrically shaped shell 105 that is positioned horizontally lengthwise. The shell 105 contains a plurality of milling balls 110, feed material/particles 120 to be milled (hBN material), all immersed in a liquid milling medium 130. As the shell 105 rotates in direction R, the milling balls 100 are lifted up on the rising side of the shell 105 and then they cascade down (or drop down on to the feed material 120), from near the top of the shell 105. In doing so, the solid feed particles 120 in between the milling balls 110 and between the balls 110 the shell 105 experience impact and shear force thereon.

A planetary ball mill 100A (FIG. 2) consists of at least one milling vessel in the form of a grinding jar 105A which is arranged eccentrically on a sun wheel or planetary disk 140. The planetary disk 140 is driven to rotate in a direction of rotation D opposite to that of the direction of rotation R grinding jars 105A, typically in a ratio of 1:−2 or 1:−1. The grinding balls 110 are contained within the grinding jars 105 with the feed material/particles 120 to be milled (in this case hBN material), all immersed in a liquid milling medium 130.

The grinding balls 110 are subjected to superimposed rotational movements, due to Coriolis forces. The difference in speeds between the milling balls 120 and grinding jars 105A produces an interaction between frictional and impact forces, which releases high dynamic energies. The interplay between these forces produces the high and very effective shear force on the feed material/particles 120 therein.

An agitated ball mill (not illustrated) includes a rotor or stirrer designed to move the balls within the shell. In some embodiments, the shell of the agitated ball mill is cylindrically shaped and positioned vertically lengthwise, with the rotor/agitator positioned at or close to the axial center of the cylindrical shell.

In each of these embodiments, the traditional ball milling configuration has been modified to use the liquid ball milling medium 130 comprises a viscous liquid comprising a viscosity of 100 to 100000 mPa·s. In addition, at least one of ball milling balls 110, or vessel 105, 105A may also comprise a polymeric material.

In operation, the ball mill 100, 100A drives movement of milling balls 110 within the vessel 105, 105A so to exert a shearing force on the hBN feed material 120 and thereby exfoliate substantially two-dimensional nanosheets from the crystal surface of the boron nitride crystal material 120 when immersed in the liquid ball milling medium 130. The product comprises atomically thin BNNSs typically having large sizes and minimum in-plane defects. The present invention therefore overcome the problems of previous attempts to produce BNNS by ball milling, i.e. increasing the size of the BNNS product and minimizing the defects created during the ball milling process. To reduce the ball-to-ball and ball-to-jar impacts a milling medium with high viscosity is used. This can be in combination with lower density polymeric based milling balls. As a result, BNNSs with diameters one order of magnitude larger than that produced by previous conditions and lower density of defects can be produced.

As described previously, the polymeric material of the ball milling balls 110, or ball milling vessel 105, 105A can comprise any suitable polymeric material. In embodiments, said polymeric material may comprise at least one of: plastic or rubber, preferably nylon, polyethylene, acetal, and polystyrene. Furthermore, the viscous liquid ball milling medium 130 preferably comprises at least one of: a high viscosity liquid; a high viscosity solution using a high molecular weight organic solute dissolved in a solvent; or a material melted to form a molten milling medium.

In order to further control or select viscosity of the milling medium, the ball mill 100, 100A may further comprise a temperature controller (not illustrated) configured to control the temperature of the milling medium during ball milling to provide a desired viscosity during ball milling.

Further processing with ultrasonication can be used to further delaminate hBN powders into BNNSs. This type of ultrasonication method, which is widely used to exfoliate graphite in the manufacture of graphene, has the advantage of being a simple process and exerts a negligible influence on the lattice structure of the BNNSs. However, the difference of electronegativity between the B and N atoms in adjacent hBN layers leads to an increase in interlayer interactions (i.e., lip-lip interactions) in addition to weak van der Waals forces, resulting in a more difficult exfoliation procedure for hBN than that when the process is applied to graphite. Thus, the BNNS yield of the ultrasonic exfoliation method alone can be very low, and the lateral size of the obtained BNNSs is correspondingly reduced with the increase in ultrasonication time. The combination of the ball milling method and apparatus of the present invention and ultrasonication provides an enhanced exfoliation method which assists and/or enhances exfoliation of hexagonal boron nitride (hBN) during or produced from ball milling. Compared with traditional ball milling alone, the addition of ultrasonication method, has greater productivity and assists in producing BNNSs with larger lateral sizes.

The ultrasound frequencies can be added to the set-up using any suitable arrangement (not illustrated). In a first embodiment, a jacket which includes an ultrasonic transducer is added onto the outside of the milling vessel. In other embodiments, an ultrasonic transducer/generator is added inside of or within one or more walls of the ball milling vessel.

The ultrasonic vibration can be applied to the viscous ball milling medium prior to, during or after ball milling operation. In preferred embodiments the ultrasonic vibration is applied to the viscous ball milling medium during ball milling operation. In some embodiments, the ultrasonic vibration has a frequency of 18 to 200 kHz, preferably 18 to 180 kHz, more preferably 18 to 150 kHz. In one embodiment, the ultrasonic components had a frequency of 40 kHz and power of 300 W.

EXAMPLES

It is to be understood that in the following example, the viscosity of the milling medium, rather than its chemical composition, is important to the impact control during the exfoliation process. The appropriate viscosity of the milling medium can be produced using a variety of different compositions. A sugar syrup solution is used as an example of producing the appropriate viscosity. It should be appreciated that other liquid compositions could equally be used to produce a milling medium of a similar viscosity. The present examples are therefore considered to demonstrate the applicability of milling medium of various compositions to the milling method of the present invention.

Furthermore, whilst the examples use a planetary mill, it should be appreciated that the results are equally applicable to other types of ball mills, including traditional/conventional ball mills and agitated ball mills. The planetary mill has used been used in the examples for demonstration purposes only.

Experimental

The production of boron nitride nanosheets (BNNS) was conducted in a planetary ball mill (MSE Supplies LLC, USA) under different conditions to show the effects of the material of balls and milling medium.

Figure 3:
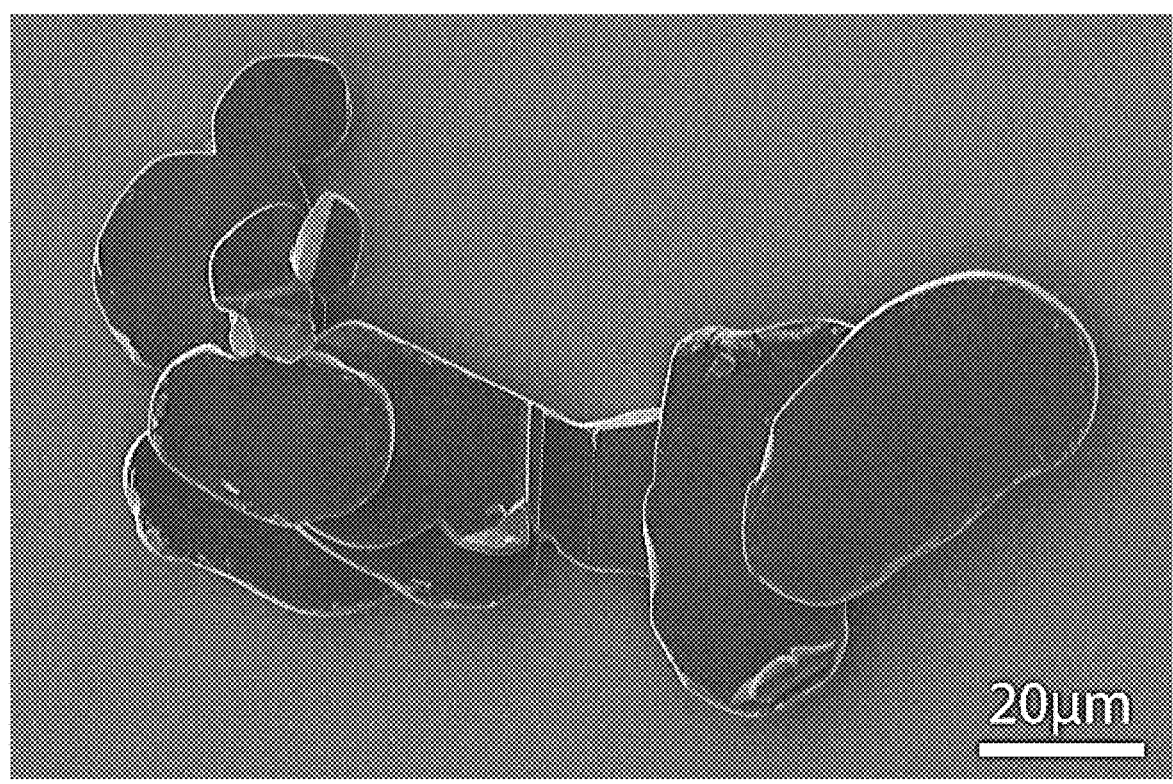
FIG. 3 provides an SEM image of the hexagonal boron nitride starting material utilised in the ball milling experimental runs.

A first experimental run was conducted in conditions in accordance to an embodiment of the present invention. In this experimental run, 10 g of hexagonal boron nitride (hBN) particles (Momentive, USA—an illustrate particle is shown in FIG. 3), about 200 g of acetal milling balls with 4 mm diameter, and 150 mL of sugar-based syrup (Woolworths Flavoured Maple Syrup, Australia—having listed ingredients of Sugar (Sucrose based), Maltodextrin, Dextrose, Caramelised Sugar Powder (Sucrose based), Water, Salt (0.11% w/w), Natural Flavouring, Preservative (202), Citric Acid) were placed in a zirconia milling jar. This sugar-based syrup had a total sugar content of 50% w/w (50 g per 100 g) and a viscosity of 2600 mPa·s as measured using HR-3 Rheometer (TA Instruments, USA) at 20° C. The milling speed was 150 rpm, and the total milling time was 5 h with reversed rotating direction every 1 h. The milling atmosphere was air. After the ball milling treatment, a small amount of sample was taken out of the jar and diluted by water. The solution was ultrasonicated for a short time of 2 mins. The solution was placed static for 1 h before one droplet of the top solution was taken for SEM imaging.

BNNS was also produced using two further experimental runs to investigate the separate effect of acetal balls, and syrup solution on the BNNS produced using ball milling undertaken using the same starting material—hexagonal boron nitride (hBN) particles (Momentive, USA—an illustrate particle is shown in FIG. 3). These runs comprised: (i) acetal balls (same as the first experiment) in a water milling medium; and (ii) steel balls with 4 mm diameter in syrup milling medium following the same procedure as above. The total weight of the steel ball was kept the same as the acetal balls in the first experimental run (about 200 g). The other ball milling conditions for the two controls were the same, i.e. speed of 150 rpm, milling time of 5 h, and milling atmosphere of air.

Two control experimental runs were also undertaken using the same starting material—hexagonal boron nitride (HBN) particles (Momentive, USA—an illustrate particle is shown in FIG. 3). Control 1 used steel balls with 4 mm diameter, and the total weight of the steel ball was kept the same as the first experimental run (about 200 g); and the milling medium is water. Control 2 used steel balls with 4 mm diameter, the total weight of the steel ball was kept the same as the first experimental run (about 200 g); and the milling medium is 50 g solid sugar (CSR white sugar, Australia). The other ball milling conditions for the two controls were the same as the first experimental run, i.e. speed of 150 rpm, milling time of 5 h, and milling atmosphere of air.

Results

The starting hBN particles have a typical disc-like shape with diameters of 10 to 50 μm and thickness in the order of 100 nm, as shown by the scanning electron microscopy (SEM) image in FIG. 3.

Figure 4A:
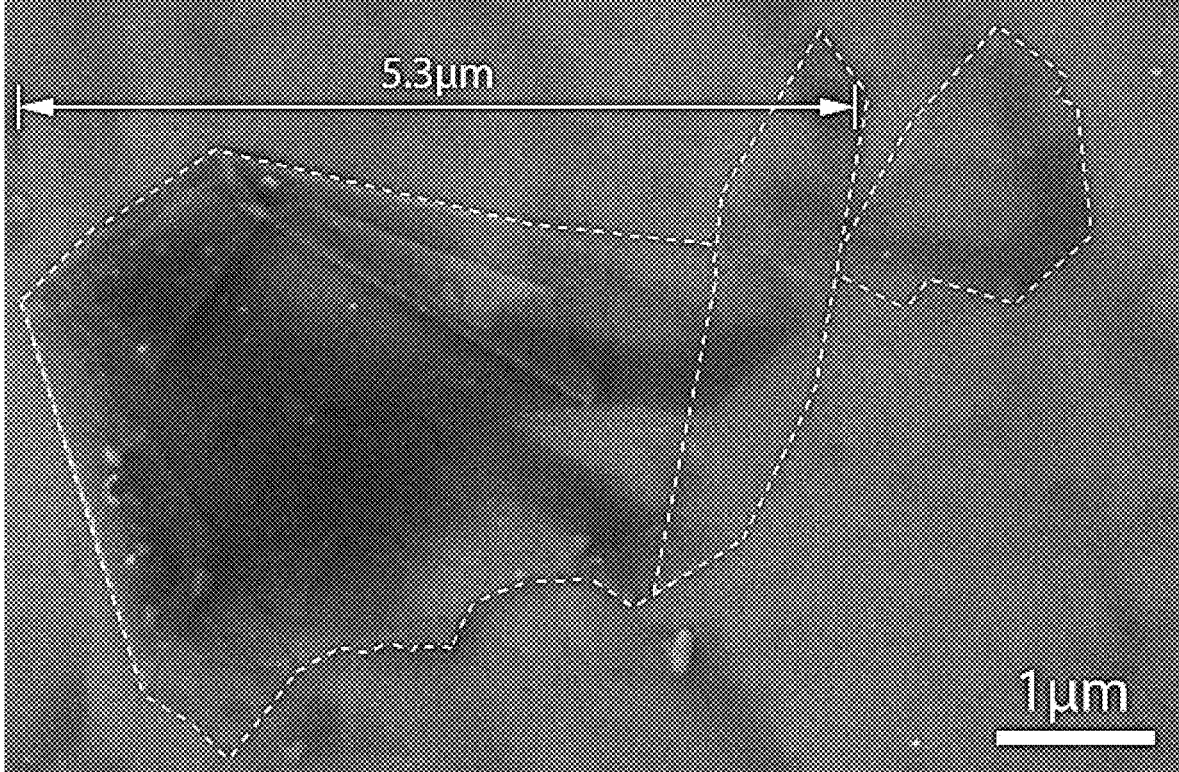
FIGS. 4A, 4B and 4C provides SEM images of the product hexagonal boron nitride material after ball milling in a syrup milling medium and using acetal (plastic) milling balls using a process according to one embodiment of the present invention.
Figure 4B:
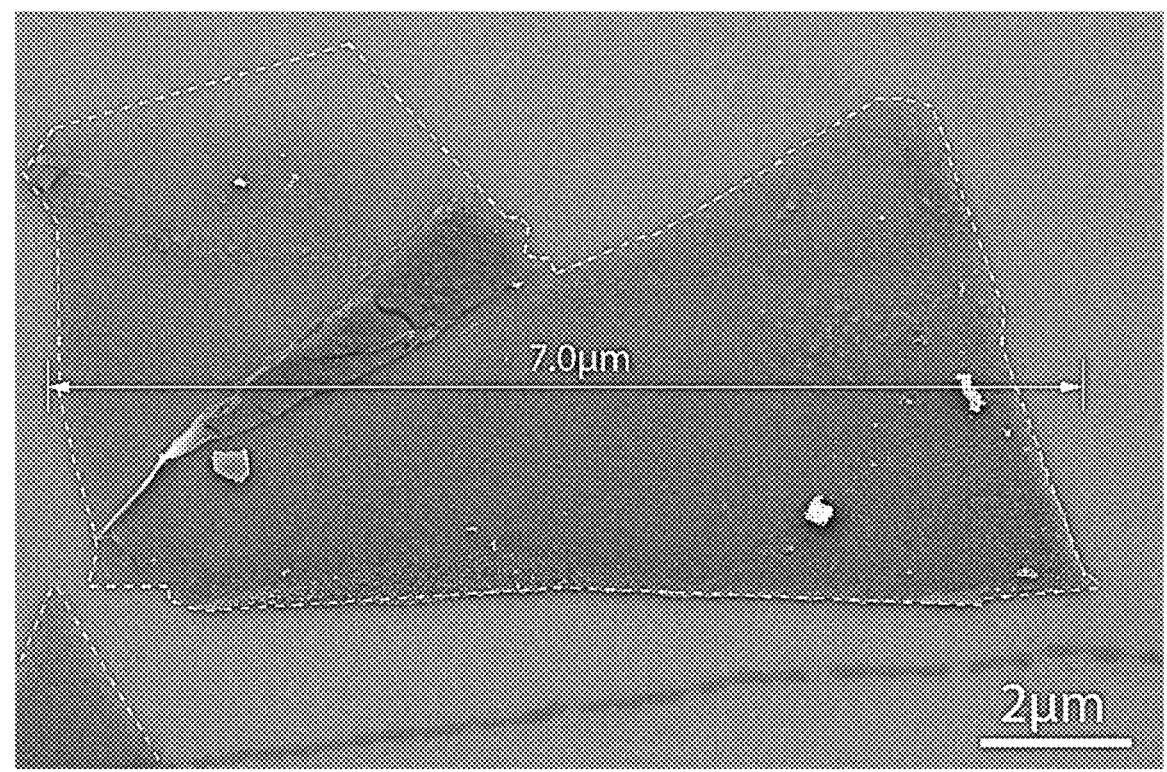
Figure 4C:
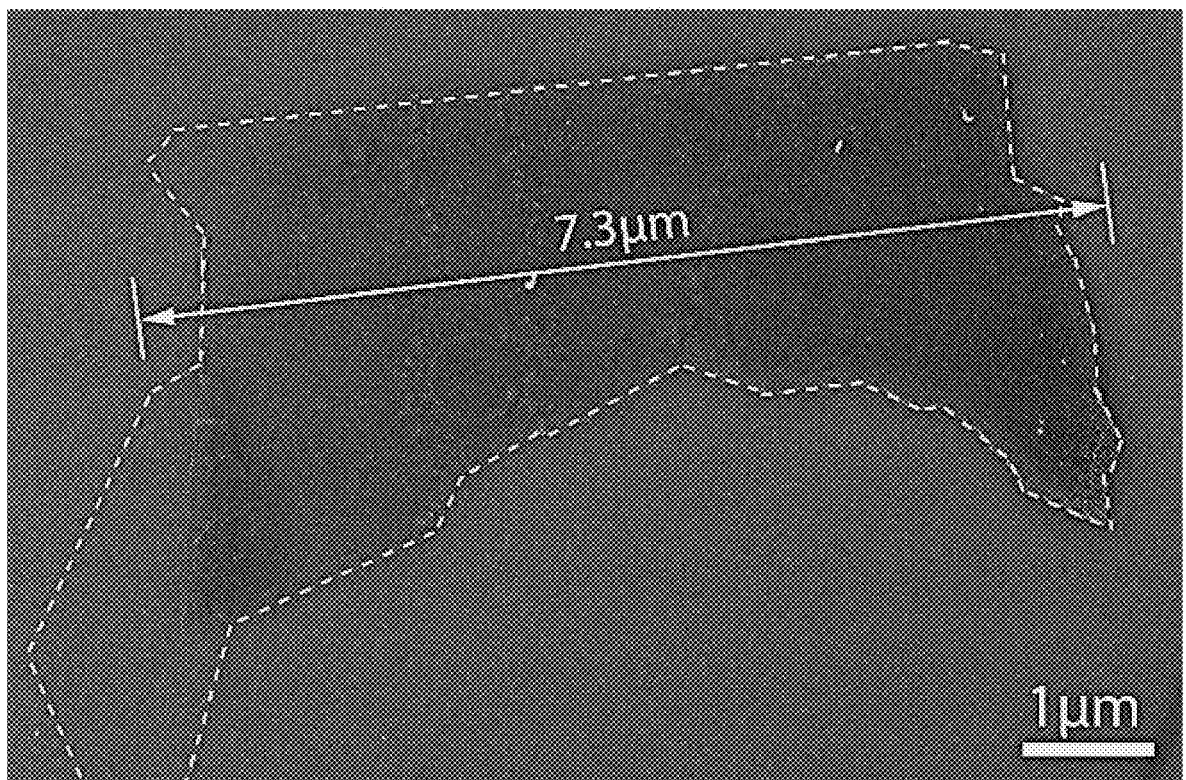

The results show that the BNNSs produced from the inventive experimental run using plastic (acetal) balls and highly viscous (syrup) milling medium shown in the SEM images of FIGS. 4A, 4B and 4C have a much larger size than the control experimental runs shown in FIG. 7A to FIG. 8C. Also, the BNNSs produced from the inventive experimental run appear to be thinner than the BNNSs from two control conditions.

All previous ball milling processes, as exemplified by the control experimental runs (as shown in the SEM images of FIG. 7A to FIG. 8C), used metal and/or ceramic balls for exfoliation of BNNS. The BNNSs from the previous ball milling processes mostly had diameters of 0.5 to 1.0 μm. The results of these experimental runs demonstrate that the BNNSs from the low-density balls and highly viscous milling medium can be produced with 5 to 10 μm in diameter (see FIGS. 4A, 4B and 4C which show particle sizes of 5.3 μm, 7.0 μm and 7.3 μm respectively), an order of magnitude larger than those that can be produced using conventional ball milling materials and milling medium.

Figure 5A:
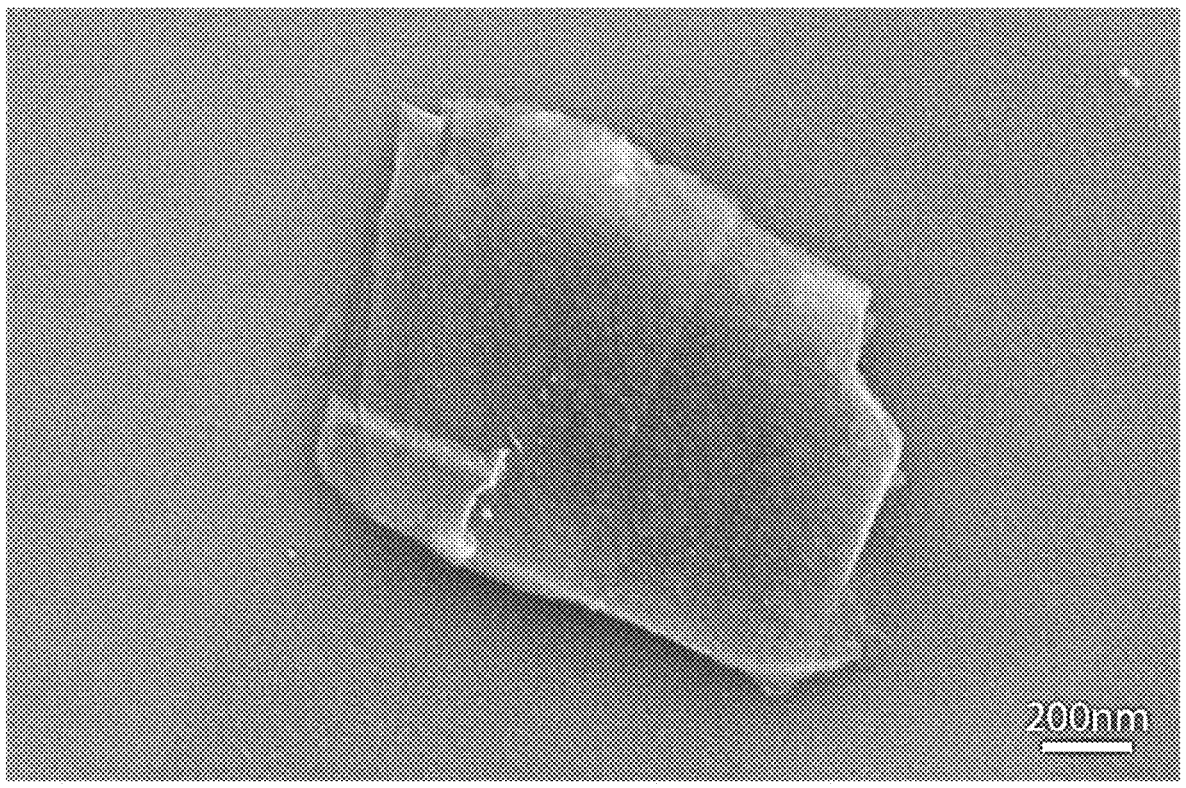
FIGS. 5A, 5B and 5C provides SEM images of the product hexagonal boron nitride material after ball milling in a water milling medium and using acetal (plastic) milling balls using a process according to one embodiment of the present invention.
Figure 5B:
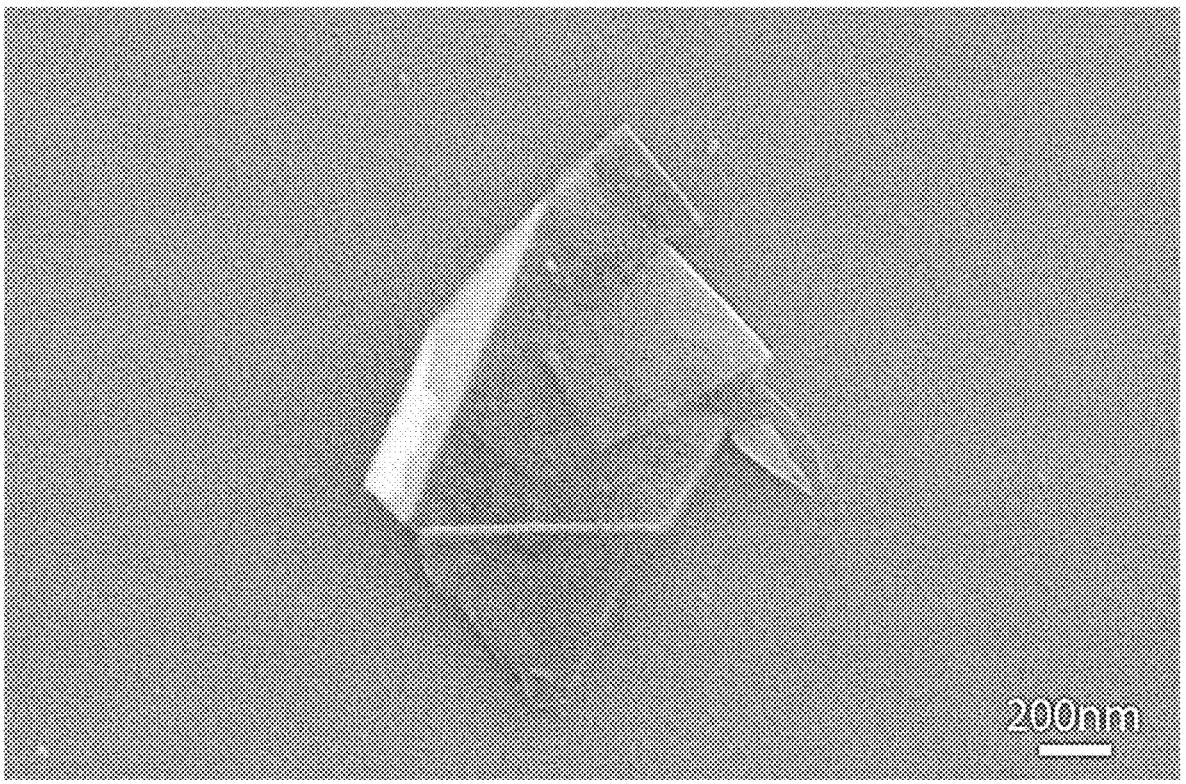
Figure 5C:
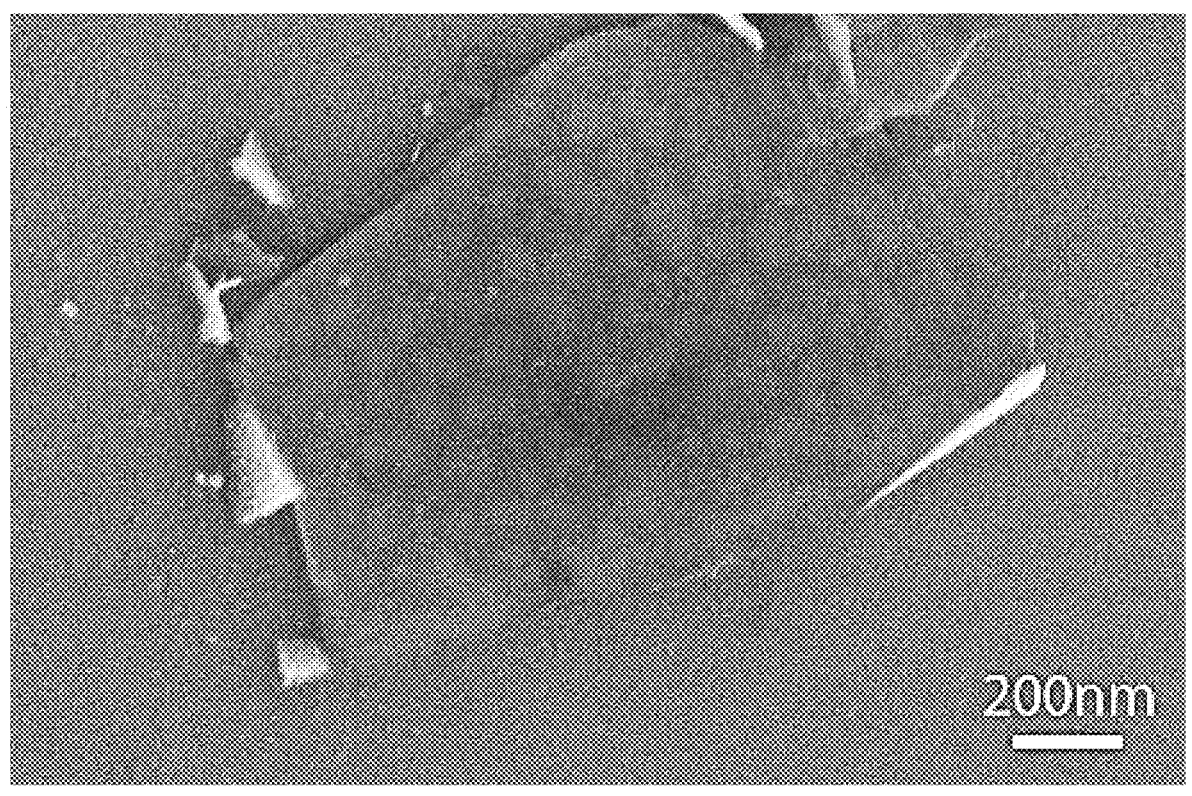
Figure 6A:
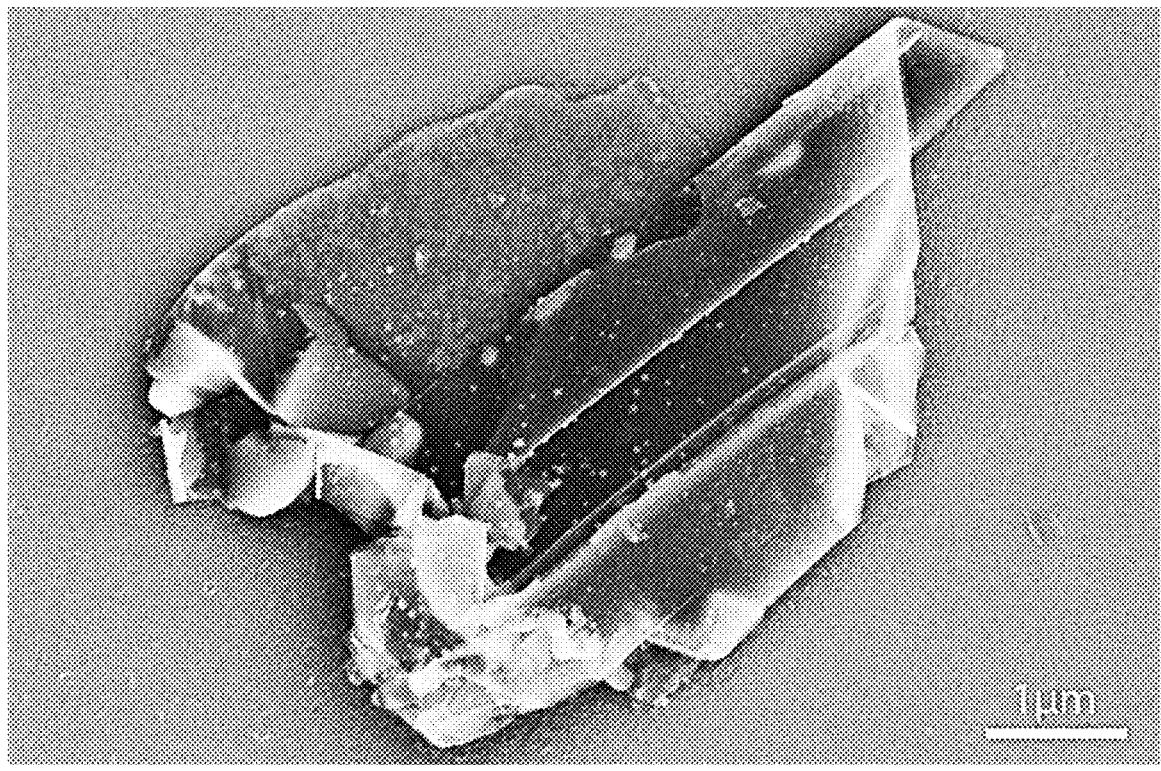
FIGS. 6A, 6B and 6C provides SEM images of the product hexagonal boron nitride material after ball milling in a syrup milling medium and using steel milling balls using a process according to one embodiment of the present invention.
Figure 6B:
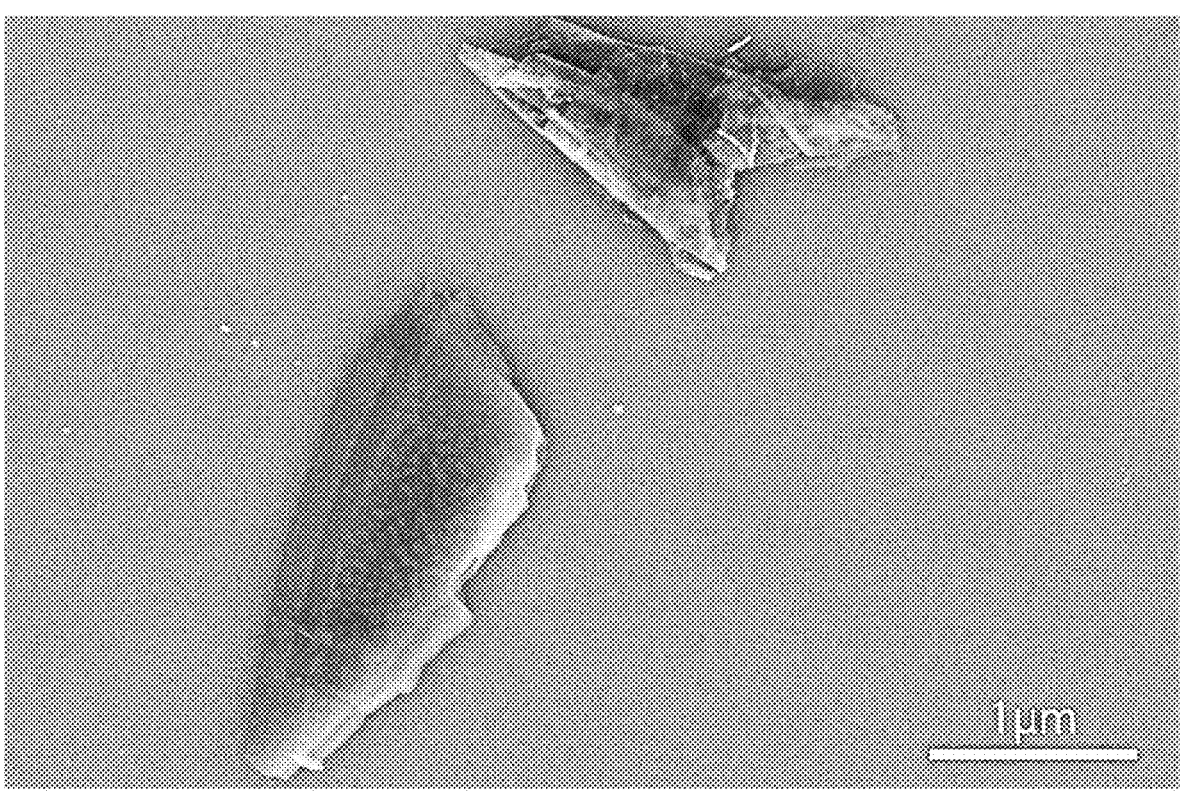
Figure 6C:
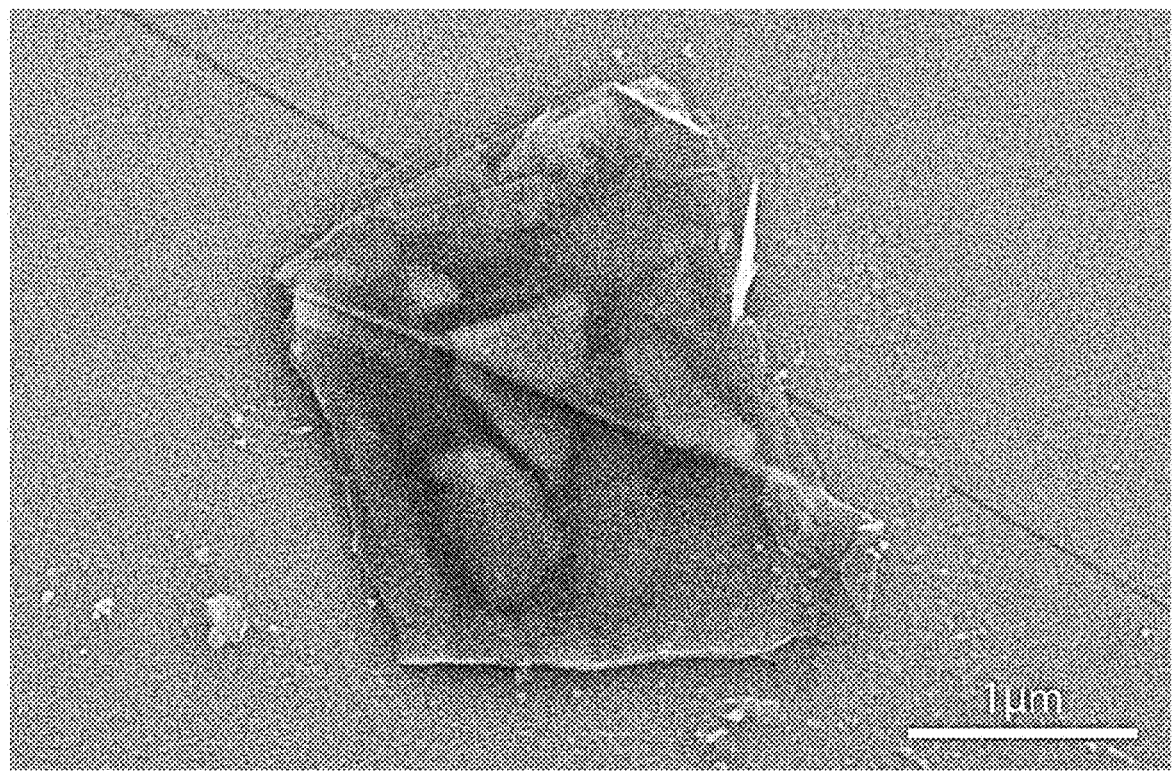
Figure 7A:
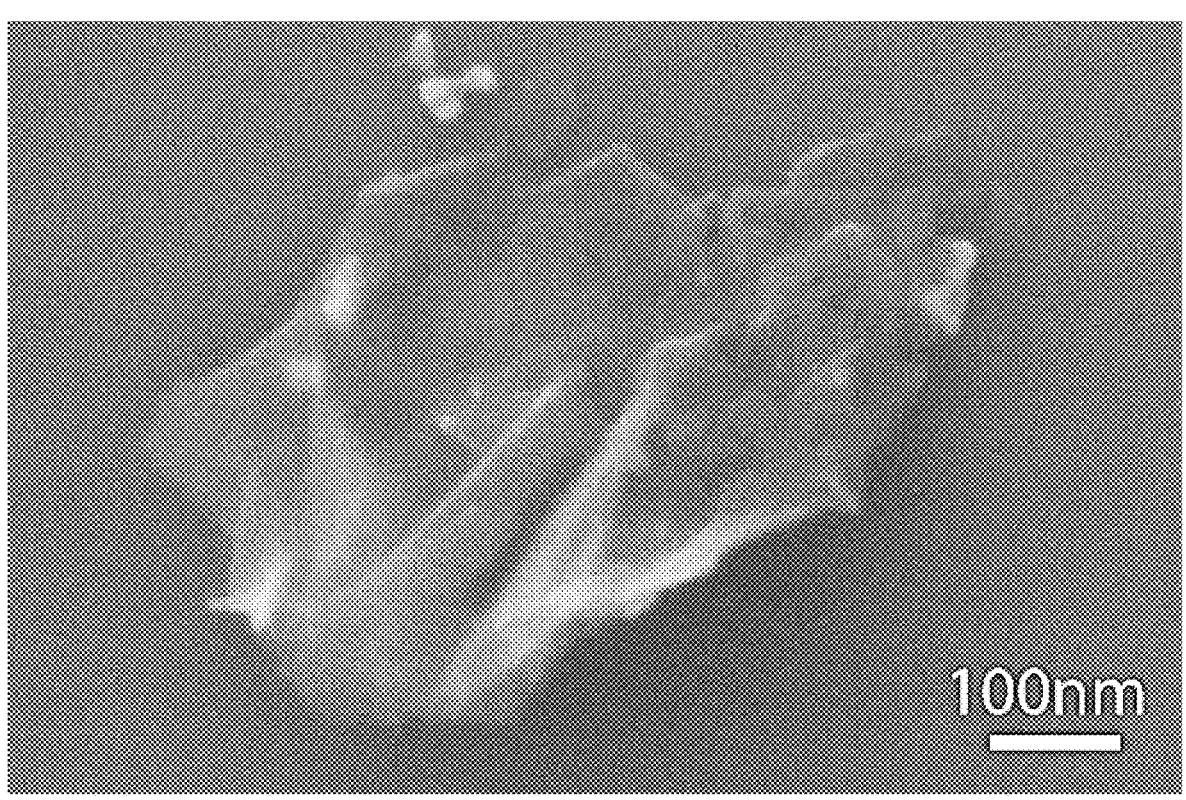
FIGS. 7A, 7B and 7C provides SEM images of the product hexagonal boron nitride material after ball milling in a water milling medium and using steel milling balls following a first comparative/control ball milling process.
Figure 7B:
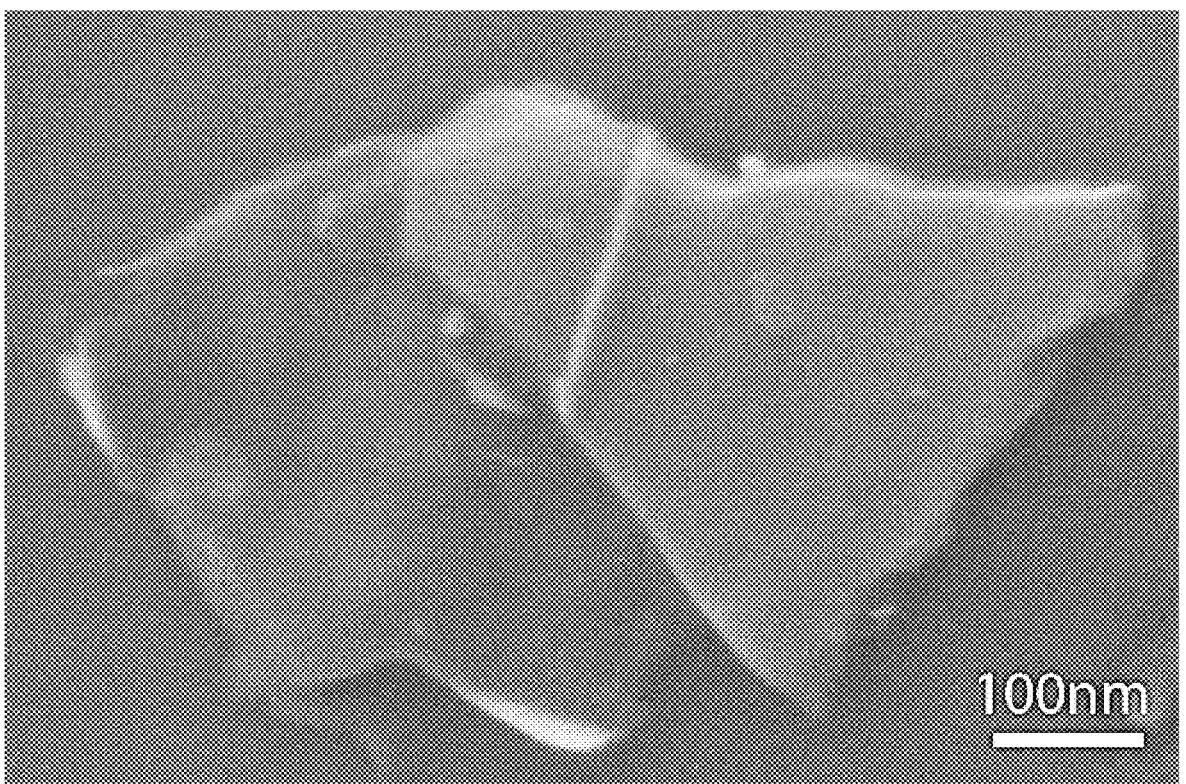
Figure 7C:
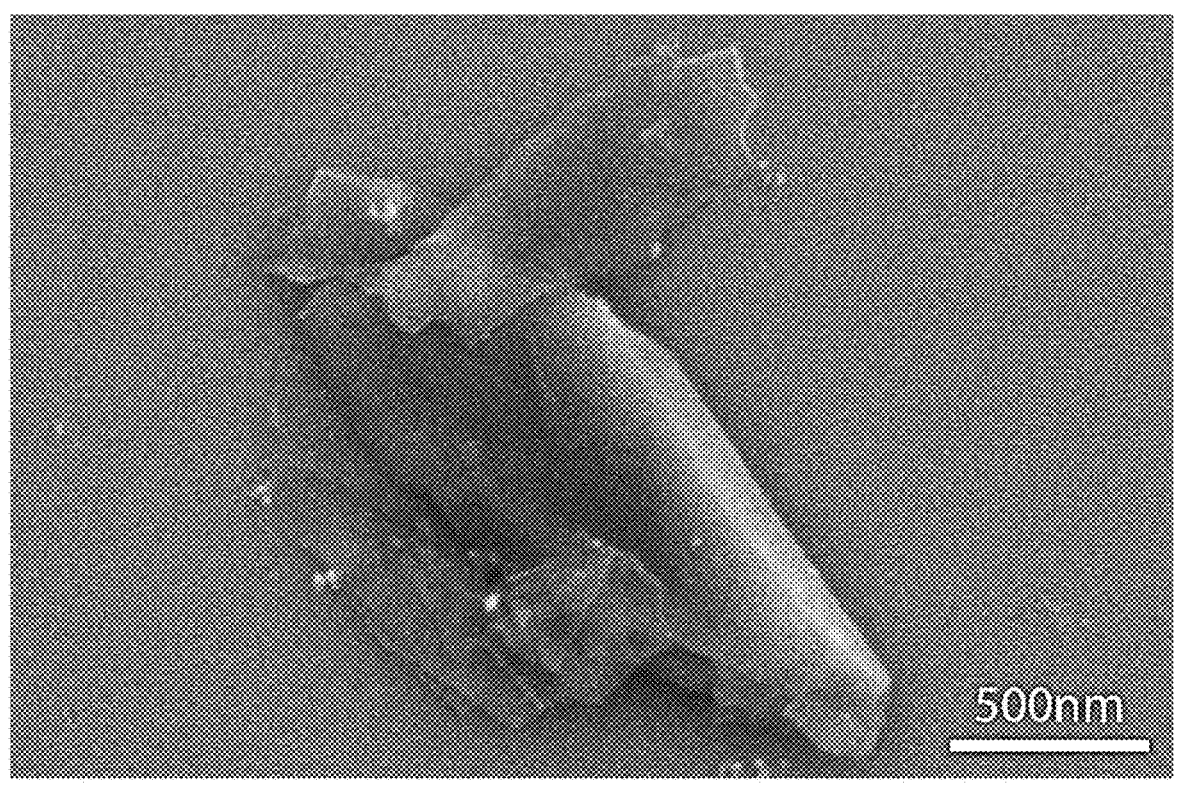

When the acetal balls and water milling medium are used (as shown in the SEM images of FIG. 5A to FIG. 5C), the average size of the BNNS is 1.0 to 2.0 μm in diameter. When the steel balls and syrup milling medium are used (as shown in the SEM images of FIG. 6A to FIG. 6C), the average size of the BNNS is 2.0 to 3.0 μm. These results show that both light density milling material and viscous milling medium help to improve the size and quality of the BNNS products.

Figure 8A:
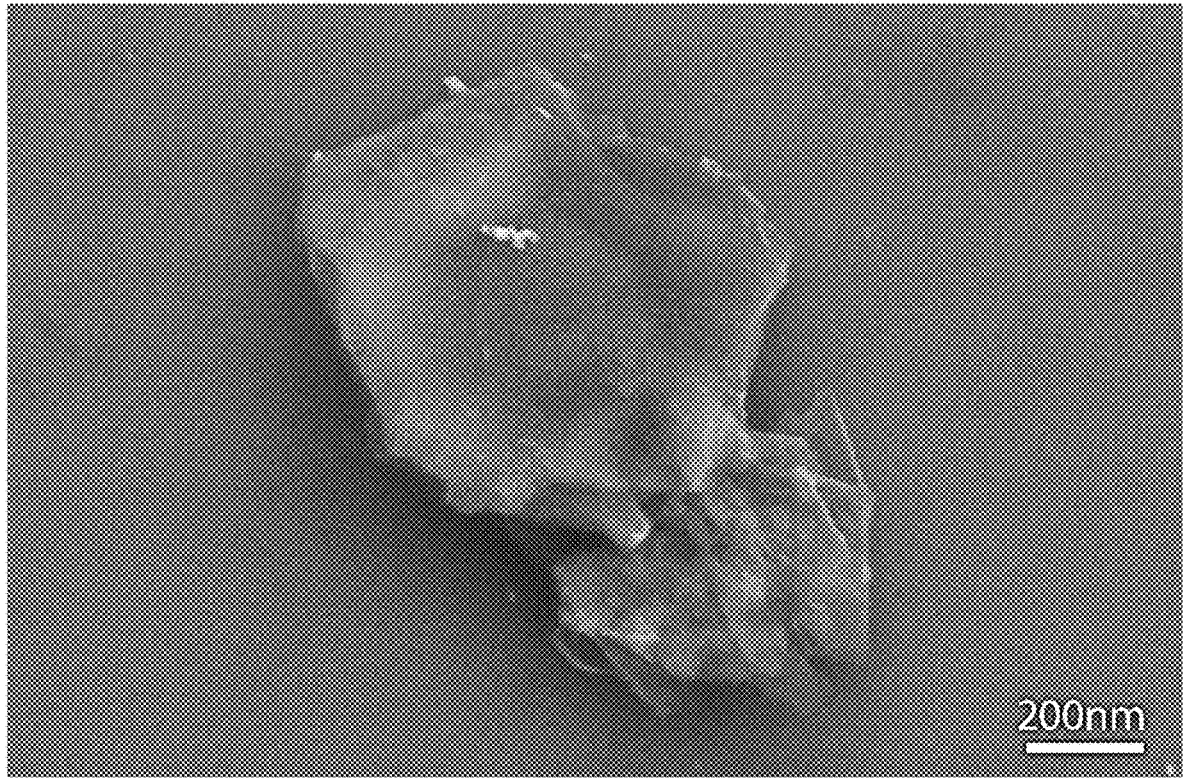
FIGS. 8A, 8B and 8C provides SEM images of the product hexagonal boron nitride material after ball milling in a solid sugar milling medium and using steel milling balls following a second comparative/control ball milling process.
Figure 8B:
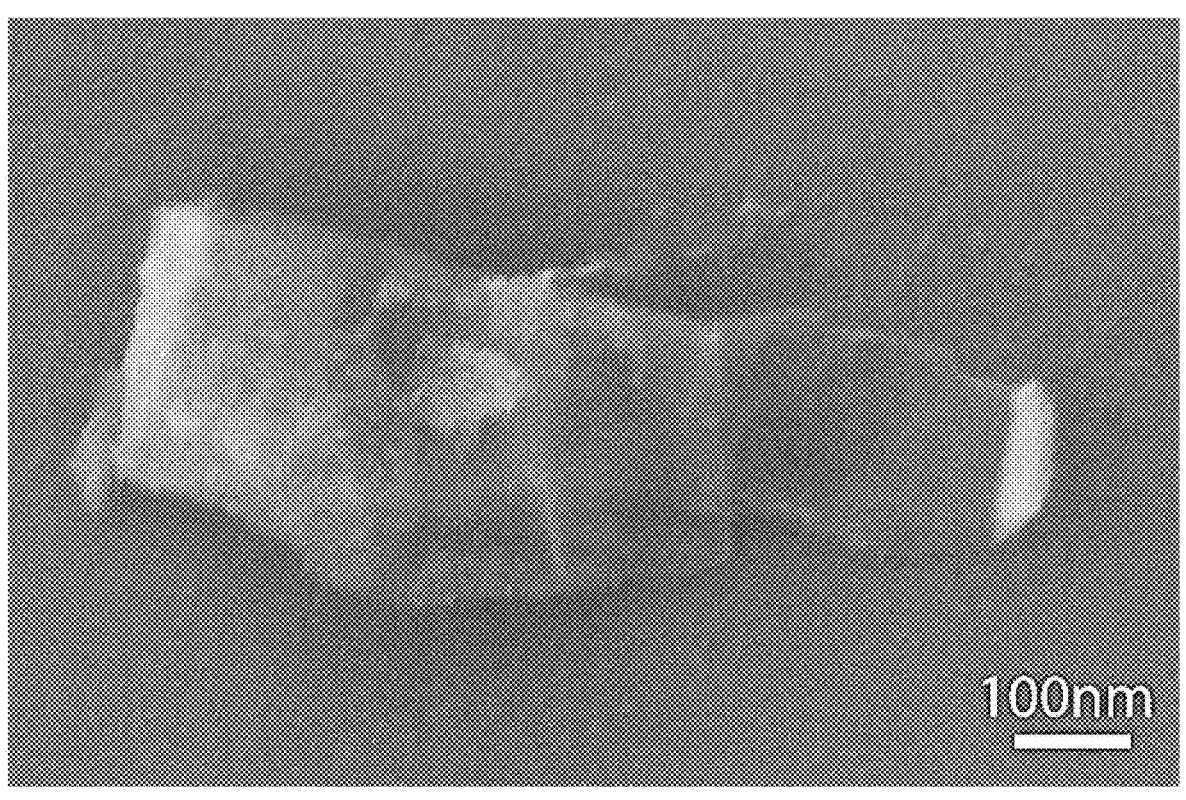
Figure 8C:
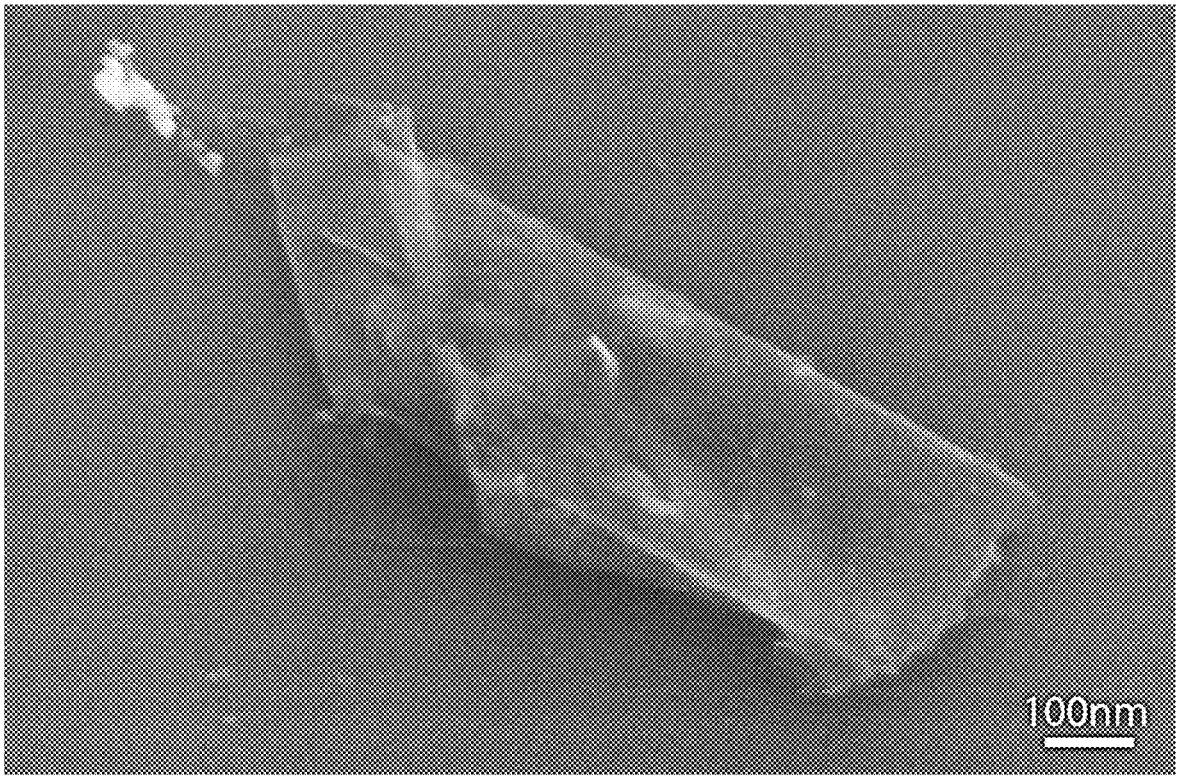

Furthermore, when the steel balls and water milling medium are used (as shown in the SEM images of FIG. 7A to FIG. 8C), the production yield of thin BNNSs seems to be much less than that from the plastic balls and syrup milling medium. This could be due to the smaller number of steel balls used in these ball milling treatments. The size of the BNNSs from steel balls in water is mainly 0.5 to 1.0 μm (FIGS. 7A to 7C), consistent with the previous studies, for example Deepika. et al. High-Efficient Production of Boron Nitride Nanosheets via an Optimized Ball Milling Process for Lubrication in Oil. Sci. Rep. 4, 7288; DOI:10.1038/srep07288 (2014). The use of solid sugar and steel balls results in even smaller BNNSs, mainly around 0.5 μm (FIGS. 8A to 8C).

Finally, the BNNSs produced from steel balls in water and solid sugar (FIGS. 7A to 7C) show more damage to their structure and hence more levels of defects compared to the BNNS produced by the inventive experimental run (FIGS. 4A, 4B and 4C). During SEM characterization, many highly deformed and corrugated hBN particles (but not exfoliated to BNNS) can be observed from the samples produced by steel balls as compared to the BNNS produced by the inventive experimental run.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. A method of producing boron nitride nanosheets, comprising:
   milling a hexagonal boron nitride crystal material in a ball mill to exfoliate substantially two-dimensional nanosheets from the boron nitride crystal material,
   wherein ball milling is undertaken within a viscous liquid ball milling medium having a viscosity of 100 to 100,000 mPa·s.

2. The method according to claim 1, wherein the viscous liquid ball milling medium has a viscosity selected from the group consisting of: 200 to 50000 mPa·s, 500 to 20000 mPa·s, 1000 to 20000 mPa·s, and 1000 to 10000 mPa· s.

3. The method according to claim 1, wherein the viscous liquid ball milling medium is selected from the group consisting of:
   (i) a high viscosity liquid;
   (ii) a high viscosity solution using a high molecular weight organic solute dissolved in a solvent; and
   (iii) a material melted to form a molten milling medium.

4. The method according to claim 3, wherein the high viscosity liquid comprises a syrup or polyethylene glycol.

5. The method according to claim 4, wherein the high viscosity liquid comprises a sugar syrup.

6. The method according to claim 3, wherein the high viscosity solution comprises polyvinyl alcohol or polyacrylamide dissolved in water, ethanol or another suitable solvent.

7. The method according to claim 3, wherein the molten milling medium comprises a molten polymer.

8. The method according to claim 1, further comprising controlling the temperature of the milling medium during ball milling to provide a desired viscosity during ball milling.

9. The method according to claim 1, wherein ball milling is undertaken using ball milling balls and/or ball milling vessel comprising a polymer material.

10. The method according to claim 9, wherein the polymeric material of the ball milling balls and/or ball milling vessel is selected from the group consisting of: plastic, rubber, nylon, polyethylene, acetal, and polystyrene.

11. The method according to claim 1, wherein the ball mill is selected from the group consisting of: a traditional ball mill; a planetary ball mill; and an agitated ball mill.

12. The method according to claim 1, further comprising the step of:

applying an ultrasonic vibration to the viscous ball milling medium during milling;

wherein the ultrasonic vibration has a frequency selected from a group consisting of: 18 to 200 kHz, 18 to 180 kHz, and 18 to 150 kHz.

13. The method according to claim 1, wherein ball milling is conducted under an air atmosphere or inert atmosphere mixture.

* * * * *